INVENTORS
ZENSUKE TAMURA
YUKIO HISHINUMA

BY Craig & Antonelli
ATTORNEYS

INVENTORS
ZENSUKE TAMURA
YUKIO HISHINUMA

BY Craig & Antonelli
ATTORNEYS

INVENTORS
ZENSUKE TAMURA
YUKIO HISHINUMA

BY Craig & Antonelli
ATTORNEYS

United States Patent Office 3,486,852

Patented Dec. 30, 1969

3,486,852

A PROCESS AND APPARATUS FOR THE DESULFURIZATION OF INDUSTRIAL WASTE GASES

Zensuke Tamura and Yukio Hishinuma, Hitachi-shi, Japan, assignors to Hitachi, Ltd., Tokyo, Japan, a corporation of Japan Filed Sept. 21, 1967, Ser. No. 669,629
Claims priority, application Japan, Sept. 21, 1966, 41/61,978, 41/61,980
Int. Cl. C01b *17/74, 17/56;* B01d *53/34*
U.S. Cl. 23—168 20 Claims

ABSTRACT OF THE DISCLOSURE

An adsorbing process and apparatus for the removal of sulfur oxides from industrial waste gases. The adsorbing unit consist of an adsorbing zone and two regenerating zones. The regenerating zones are a water washing zone and a drying zone. The washing liquid from the washing zone can be neutralized with an alkaline compound in a neutralization tank or passed to an acid concentrator.

BACKGROUND OF THE INVENTION

Field of the invention

The present invention relates to a process and apparatus for the desulfurization of industrial waste gases by the use of active carbon which is regenerated repeatedly by rinsing it with water upon contamination and more specifically to improvements in the disposition of the water having used in the rinsing and desorbing step in said process.

DESCRIPTION OF THE PRIOR ART

In operating the process for the desulfurization of industrial waste gases using active carbon which is regenerated repeatedly for reuse, the water having been used for desorbing sulfur oxides from the active carbon has heretofore been discarded after passing it through a tank containing a limestone bed therein or neutralizing it with sea water.

SUMMARY OF THE INVENTION

An object of the present invention is to provide a process and apparatus for the desulfurization of industrial waste gases using active carbon, characterized in that the water having been used for desorbing sulfurous anhydride ($SO_2$) and sulfuric anhydride ($SO_3$) from the active carbon is concentrated by directly heating the same, to give dilute sulfuric acid.

Another object of the present invention is to provide a process and apparatus of the type described above, which is added with the step of neutralizing the water having been used in the rinsing and desorption step, preparatory to the abandonment, when the step of producing a dilute sulfuric acid by directly heating the water becomes inoperative due to operational trouble or when the water is discharged in an amount more than can be processed by said dilute sulfuric acid producing step due to variation in amount of the waste gases being processed.

The process and apparatus for the desulfurization of industrial waste gases according to the present invention, which comprises at least the steps of adsorbing sulfur oxides present in the waste gases with active carbon and rinsing the contaminated active carbon with water to remove the sulfur oxides therefrom for the regeneration of said active carbon for reuse, is characterized by being added with the step of concentrating the water having been used in said rinsing step and being in the state of dilute sulfuric acid, by heating it directly and further with the step of neutralizing said water.

DESCRIPTION OF THE PREFERRED EMBODIMENTS

Figure 1:
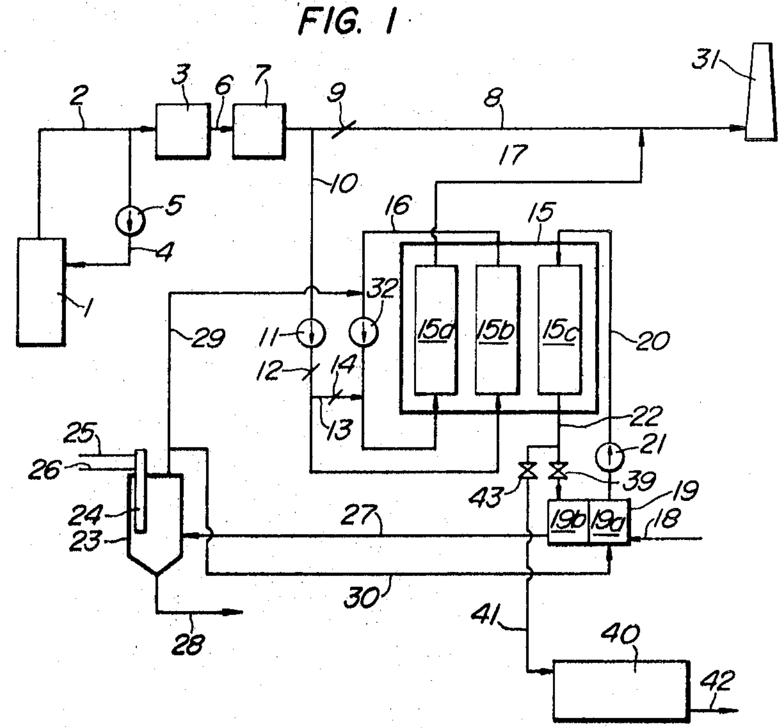
FIG. 1 is a flow sheet of an embodiment of the apparatus to be used for practicing the process of this invention and FIGS. 2 and 3 respectively are flow sheets, similar to FIG. 1, of the other embodiments of the apparatus.

Referring to FIG. 1, the waste gases from a boiler 1 flow through a duct 2, an air preheater 3 and a duct 6 into a dust collector 7 wherein they are cleared of dusts. The waste gases leaving the dust collector 7 flow through a duct 10 and, after pressurized by a blower 11, flow into a drying region **15*b* in an adsorption-desorption apparatus 15, wherein they serve to dry active carbon which has been wet as a result of rinsing in the preceding rinsing and desorbing step. In this case, part of the waste gases is diverged to flow through a duct 13** leading to an adsorption region in the apparatus.

The waste gases entering the drying region dry the wet active carbon as stated but, concurrently they have part of the sulfurous anhydride contained therein adsorbed by the active carbon, so that, when they leave the region, they have a decreased sulfurous anhydride concentration and increased water content.

The waste gases leaving the drying region **15*b* proceed through a duct 16 and, after pressurized by a blower 32, enter an adsorption region 15*a* in said apparatus, together with the waste gases which enter the duct 16 through the duct 13 upon having their flow rate regulated by a damper 14**.

The flow rates of the waste gases flowing through the duct 10 and duct 13 are regulated by the damper 14 in accordance with the operational state of the adsorption-desorption apparatus 15.

The waste gases leaving the adsorption region **15*a*, after having had the sulfurous anhydride and sulfuric anhydride gases removed therefrom by the adsorbing action of the active carbon, are led through ducts 17 and 8 and released into the atmosphere through a chimney 31**.

The active carbon in a rinsing-desorption region **15*c* in the apparatus is rinsed with water poured thereon from the top of said region. The water used for rinsing the active carbon is supplied through a conduit 18 into a sub-tank 19*a* in a water tank 19 to be accumulated therein and pumped up through a conduit 20 by a pump 21. The resultant washings is led into a sub-tank 19*b* through a conduit 22** and accumulated in said sub-tank.

The functions of the respective regions in the adsorption-desorption apparatus are shifted one after another at a certain time interval, so that a cycle of operation consisting of adsorption, rinsing-desorption and drying, is carried out concurrently repeatedly.

The washings accumulated in the sub-tank **19*b* is led into a concentration tank 23 through a conduit 27, wherein it is concentrated by being heated directly by a burner 24 and the dilute sulfuric acid thus produced is sent to a sulfuric acid or ammonium sulfate production plate through a conduit 28. Reference numeral 25 designates a fuel supply line and 26 designates an air supply line. The combustion gases from the burner 24 are led into the duct 16 through a duct 29 to be introduced into the adsorption region 15*a*, while part thereof is sent to the sub-tank 19*a* through a conduit 30** to preheat the rinsing water.

Reference numerals 39 and 43 are change-over valves provided in the conduit 22 and a conduit 41 respectively. The conduit 41 is branched from the conduit 22 to lead the washings from the rinsing-desorption region 15_c_ into a neutralizing tank 40, if and when the concentration device becomes in operative due to malfunction or the amount of the washings increase more than that which can be processed by the concentration device. The washings introduced into the neutralizing tank are neutralized with an alkaline compound contained therein and, after neutralization, discharged through a discharge port 42.

Figure 2:
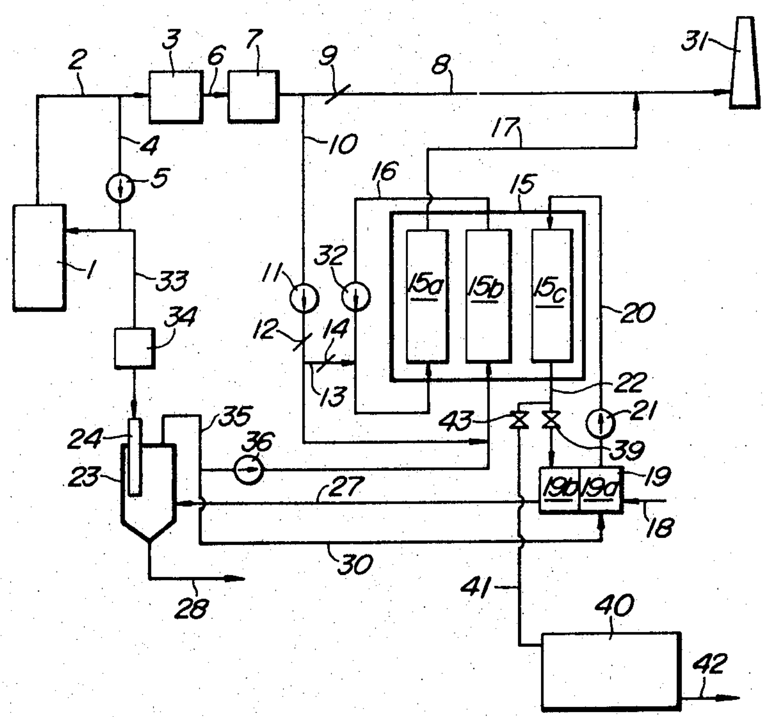

FIG. 2 shows another embodiment wherein the waste gases from the boiler are used as a heating source in the concentration tank 23 and gases leaving the concentration tank are partially utilized for the preheating of the rinsing water.

For this purpose, there are provided a waste gas supply line 33 which is branched from a waste gas circulation line 4 and leading to the burner 24, a dust collector 34, a blower 36 to send the gases, leaving the concentration tank 23, from a line 35 to the drying region 15_b_ in the adsorption-desorption apparatus 15 and a line 30 which is branched from the line 35 to lead the gases, leaving the concentration tank 23, to the sub-tank 19_a_ to preheat the rinsing water therein.

Figure 3:
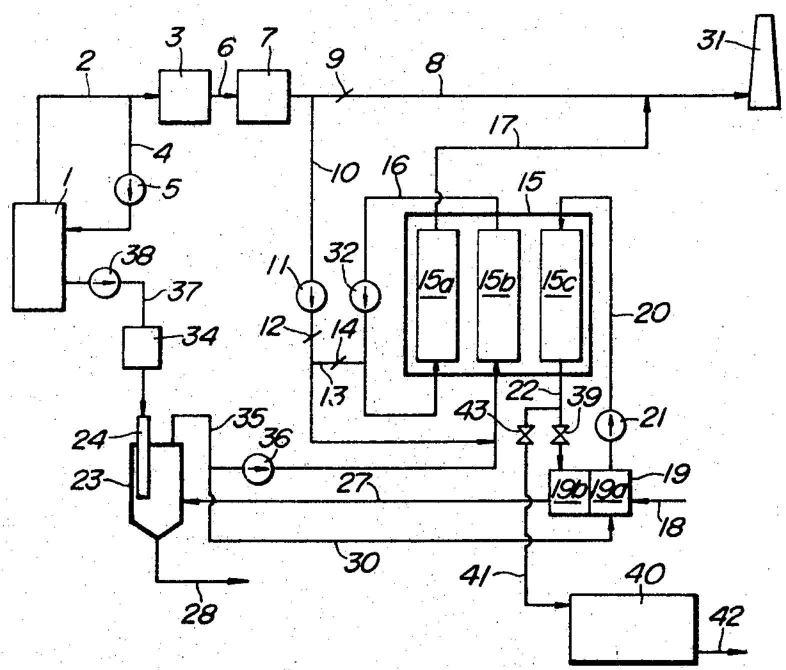

FIG. 3 shows still another embodiment in which the combustion gases from the boiler are used as a heating source in the concentration tank. In this case, as shown, the combustion gases from the boiler are taken out through a line 37 by a blower 38 and lead to the burner 24 through the dust collector 34. The rest of the arrangements are the same as in the embodiment shown in FIG. 2.

The present invention has the advantages that the disposition of the washing after rinsing the active carbon, is rendered easy because utilization of the same for the production of dilute sulfuric acid is made possible by addition of the step of directly heating said washings, that the processes can be carried out with enhanced economy as a result of utilizing part of the combustion gases or waste gases from the boiler as a heating source in the step of directly heating the washings, and further that, by the provision of the neutralizing step, it is possible to eliminate the public hazard which would be induced when the step of concentrating the washings by directly heating the same becomes inoperative due to malfunction or the amount of waste gases being processed increase to an extent beyond the capacity of the desulfurization apparatus.

What is claimed is:

1. A process for the desulfurization of industrial waste gases and recovering sulfuric acid as a by-product therefrom by concurrently utilizing an adsorption stage, a drying stage, a rinse-desorption stage and a concentration stage, the adsorption-drying-rinse-desorption stages being periodically and alternately shifted in a time sequence, which comprises introducing a portion of the industrial waste gases into the adsorption stage to remove sulfur oxide gases therefrom, and introducing the remaining portion into the drying stage for drying the active carbon contained therein which has been wet in the preceding rinse-desorption stage, directing the waste gases leaving the drying stage into the adsorption stage, removing the waste gases free of sulfur oxides from the adsorption stage and releasing said gases to the atmosphere, introducing rinsing water into the rinse-desorption stage to desorb the sulfur oxides therein, removing the washings from the rinse-desorption stage and introducing said washings into the concentration stage, heating the washings in said concentration stage and recovering the sulfuric acid produced.

2. The process of claim 1, wherein the waste gases leaving the drying stage have a decreased sulfurous anhydride concentration and an increased water content.

3. The process of claim 1, wherein a portion of the combustion gases produced in heating the washings in the concentration stage are introduced into the adsorption stage and the remaining portion is used to preheat the rinsing water.

4. The process of claim 1, wherein washings removed from the rinse-desorption stage can optionally be introduced into a neutralizing stage when the concentration stage becomes inoperative or unable to process excessive amounts of said washings.

5. The process of claim 1, wherein a portion of the industrial waste gases is conveyed to the concentration stage to heat the washings contained therein.

6. The process of claim 5, wherein a portion of the gases leaving the concentration stage are used to preheat the rinsing water and the remainder of said gases are introduced into the drying stage.

7. The process of claim 1, wherein the combustion gases utilized in the production of industrial waste gases are conveyed to the concentration stage to heat the washings contained therein.

8. A process for the desulfurization of industrial waste gases according to claim 1, which the waste gases from a boiler are used as a heating source in the step of concentrating the washings.

9. A process for the desulfurization of industrial waste gases according to claim 1, in which the combustion gases from a boiler are used as a heating source in the step of concentrating the washings.

10. A process for the desulfurization of industrial waste gases according to claim 1, in which said process further comprises the step of neutralizing the washings from the rinsing step with an alkaline compound preparatory to the abandonment of the same.

11. An appaartus for the desulfurization of industrial waste gases and recovering sulfuric acid as a by-product therefrom by concurrently utilizing an adsorption tank, a drying tank, a rinse-desorption tank, and a concentration tank, and a means for periodically and alternately shifting the adsorption-drying-rinse-desorption tanks in a time sequence which comprises conduit means for introducing a portion of the industrial waste gases into the adsorption tank to remove sulfur oxide gases therefrom, conduit means for introducing the remaining portion into the drying tank for drying the active carbon contained therein which has been wet in the preceding rinse-desorption tank, conduit means for directing the waste gases leaving the drying tank into the adsorption tank, conduit means for removing the waste gases free of sulfur oxides from the adsorption stage and releasing said gases to the atmosphere, conduit means for introducing rinsing water into the rinse-desorption tank to desorb the sulfur oxides therein, conduit means for removing the washings from the rinse-desorption stage and introducing said washings into the concentration tank, means for heating the washings in said concentration tank and means for recovering the sulfuric acid produced.

12. The apparatus of claim 11, wherein conduit means are provided for introducing a portion of the combustion gases produced in heating the washings in the concentration tank into the adsorption tank and conduit means are provided for conveying the remaining portion of the combustion gases to the rinse-desorption tank to preheat the rinsing water.

13. The apparatus of claim 11, wherein conduit means are provided for optionally introducing the washings from the rinse-desorption stage into a neutralizing tank when the concentration tank becomes inoperative or unable to process excessive amounts of said washings.

14. The apparatus of claim 11, wherein conduit means are provided for conducting a portion of the industrial waste gases to the concentration tank to heat the washings contained therein.

15. The apparatus of claim 11, wherein conduit means are provided for conveying a portion of the gases leaving the concentration tank to the rinse-desorption tank to preheat the rinsing water and conduit means are provided for introducing the remainder of said gases to the drying tank.

16. The apparatus of claim 11, wherein conduit means are provided for conveying the combustion gases utilized in the production of waste gas to the concentration tank to heat the washings contained therein.

17. The apparatus of claim 11, wherein the industrial waste gases eminate from a boiler means.

18. The apparatus of claim 17, wherein an air preheater and a dust collector are disposed in the conduit means between the boiler means and the adsorption tank.

19. The apparatus of claim 14, wherein a dust collector is disposed in said conduit means.

20. The apparatus of claim 11, wherein the heating means is a direct heating means.

References Cited

UNITED STATES PATENTS

| | | | |
|---|---|---|---|
| 2,992,895 | 7/1961 | Feuster et al. | 23—178 |
| 3,087,291 | 4/1963 | Jackson et al. | 55—73 |
| 3,172,725 | 3/1965 | Rugh | 55—73 |
| 3,294,487 | 12/1966 | Pauling | 23—178 |

REUBEN FRIEDMAN, Primary Examiner

CHARLES N. HART, Assistant Examiner

U.S. Cl. X.R.

23—2, 178; 55—73, 180

Notice of Adverse Decision in Interference

In Interference No. 99,023, involving Patent No. 3,486,852, Z. Tamura and Y. Hishinuma, PROCESS AND APPARATUS FOR THE DESULFURIZATION OF INDUSTRIAL WASTE GASES, final judgment adverse to the patentees was rendered June 28, 1977, as to claims 1 and 2.

[*Official Gazette October 25, 1977.*]